(12) United States Patent
Vermeulen et al.

(10) Patent No.: US 9,548,065 B2
(45) Date of Patent: Jan. 17, 2017

(54) ENERGY POST QUALIFICATION FOR PHRASE SPOTTING

(71) Applicant: SENSORY, INCORPORATED, Santa Clara, CA (US)

(72) Inventors: Pieter J. Vermeulen, Portland, OR (US); John-Paul Hosom, Portland, OR (US)

(73) Assignee: Sensory, Incorporated, Santa Clara, CA (US)

(*) Notice: Subject to any disclaimer, the term of this patent is extended or adjusted under 35 U.S.C. 154(b) by 139 days.

(21) Appl. No.: 14/269,678

(22) Filed: May 5, 2014

(65) Prior Publication Data
US 2015/0317980 A1  Nov. 5, 2015

(51) Int. Cl.
| | | |
|---|---|---|
| G10L 15/00 | (2013.01) | |
| G10L 25/15 | (2013.01) | |
| G10L 19/00 | (2013.01) | |
| G10L 15/08 | (2006.01) | |
| G10L 15/22 | (2006.01) | |
| G10L 25/87 | (2013.01) | |
| G10L 25/21 | (2013.01) | |

(52) U.S. Cl.
CPC .............. *G10L 25/15* (2013.01); *G10L 15/22* (2013.01); *G10L 19/00* (2013.01); *G10L 25/21* (2013.01); *G10L 25/87* (2013.01); *G10L 2015/088* (2013.01); *G10L 2015/225* (2013.01)

(58) Field of Classification Search
CPC .............................. G10L 21/0208; G10L 19/12
USPC .................................................... 704/223, 225
See application file for complete search history.

(56) References Cited

U.S. PATENT DOCUMENTS

| | | | | |
|---|---|---|---|---|
| 4,630,305 | A | * | 12/1986 | Borth .................. G10L 21/0208 381/317 |
| 2004/0260547 | A1 | * | 12/2004 | Cohen et al. ................. 704/233 |
| 2006/0018457 | A1 | * | 1/2006 | Unno et al. ............. 379/388.04 |
| 2008/0059188 | A1 | * | 3/2008 | Konopka et al. ............. 704/257 |
| 2010/0302033 | A1 | * | 12/2010 | Devenyi et al. ............. 340/540 |
| 2011/0090944 | A1 | * | 4/2011 | Kim et al. .................... 375/227 |

* cited by examiner

*Primary Examiner* — Shreyans Patel
(74) *Attorney, Agent, or Firm* — Fountainhead Law Group P.C.

(57) ABSTRACT

In one embodiment, a computing device can detect an utterance of a target phrase within an acoustic input signal. The computing device can further determine a first estimate of cumulative signal and noise energy for the detected utterance in the acoustic input signal with respect to a first time period spanning the duration of the detected utterance, and a second estimate of noise energy in the acoustic input signal with respect to a second time period preceding (or following) the first time period. The computing device can then calculate a signal-to-noise ratio (SNR) for the detected utterance based on the first and second estimates and can reject the detected utterance if the SNR is below an SNR threshold.

20 Claims, 4 Drawing Sheets

ENERGY POST QUALIFICATION FOR PHRASE SPOTTING

BACKGROUND

In the field of speech recognition, phrase spotting (also known as "word spotting" or "keyword spotting") refers to the task of detecting the utterance of a target word or phrase within an acoustic input signal. In certain use cases, such as voice-based trigger scenarios, a phrase spotting system (running on, e.g., a smartphone or tablet) can perform phrase spotting on a continuous basis as it listens to sounds in its environment. If the phrase spotting system "spots" the target phrase (i.e., determines that the phrase has been spoken), the phrase spotting system can cause its host device (or another system/device) to take an action, such as processing a verbal command immediately following the target phrase, invoking an application, or the like.

One problem with performing phrase spotting on a continuous basis is that, due to environmental (i.e., background) noise, the phrase spotting system will likely generate a number of false accepts over a period of time. As known in the art, a "false accept" occurs when the phrase spotting system detects that the target phrase has been uttered when, in fact, it has not. In contrast, a "false reject" occurs when the phrase spotting system determines that the target phrase has not been uttered when, in fact, it has. If these false accepts occur frequently enough, the usability of the system can be impacted. Accordingly, it would be desirable to have improved phrase spotting techniques that address the foregoing and other similar issues.

SUMMARY

In one embodiment, a computing device can detect an utterance of a target phrase within an acoustic input signal. The computing device can further determine a first estimate of cumulative signal and noise energy for the detected utterance in the acoustic input signal with respect to a first time period spanning the duration of the detected utterance, and a second estimate of noise energy in the acoustic input signal with respect to a second time period preceding (or following) the first time period. The computing device can then calculate a signal-to-noise ratio (SNR) for the detected utterance based on the first and second estimates and can reject the detected utterance if the SNR is below an SNR threshold.

A further understanding of the nature and advantages of the embodiments disclosed herein can be realized by reference to the remaining portions of the specification and the attached drawings.

DETAILED DESCRIPTION

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

The present disclosure describes a technique, referred to as "energy post qualification" (EPQ), that can be used in conjunction with (or implemented within) a phrase spotting system to reduce the number of false accepts generated by the system. EPQ operates on the assumption that, when a speaker utters a target phrase, the utterance will generally be louder than the surrounding background noise. Thus, EPQ filters out (i.e., rejects) any spots made by the phrase spotting system where the estimated signal-to-noise ratio (SNR) of the spotted utterance is less than a particular SNR threshold (e.g., zero dB). In certain embodiments, EPQ can perform this filtering without significantly increasing the false reject rate of the system.

1. Exemplary System Environment

Figure 1:
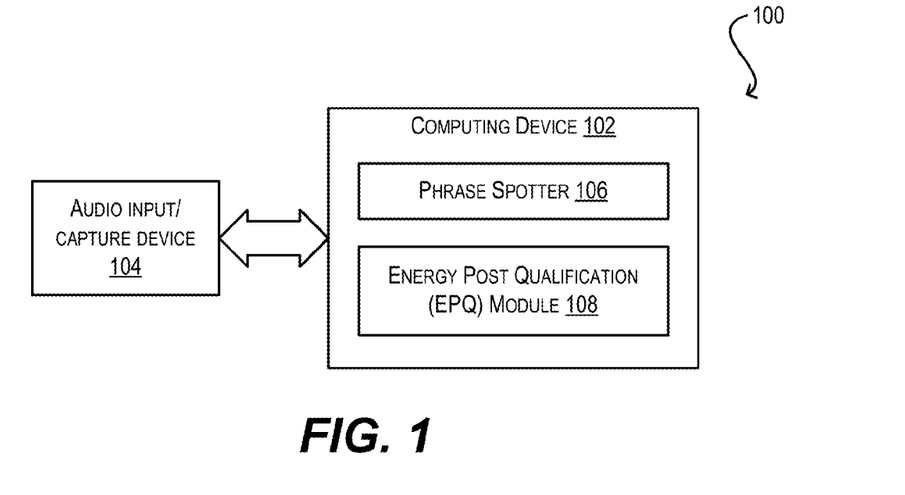
FIG. 1 depicts a block diagram of a system environment according to one embodiment.

FIG. 1 depicts a block diagram of a system environment 100 according to an embodiment. As shown, system environment 100 includes a computing device 102 that is communicatively coupled with an audio input/capture device 104. Computing device 102 can be, e.g., a server computer system or an end-user device (e.g., a smartphone, tablet, laptop computer, desktop computer, etc.). Audio input/capture device 104 can be, e.g., a microphone, a voice recorder, a headset, or the like. In certain embodiments, audio input/capture device 104 can incorporated into (i.e., integrally included in) computing device 102. In other embodiments, audio input/capture device 104 can be separate from computing device 102 and can communicate with device 102 via an external connection mechanism (e.g., a point-to-point cable or wireless protocol, a local or wide area network, etc.).

In operation, computing device 102 can receive an acoustic input signal from audio input/capture device 104. For example, the acoustic input signal can comprise audio data that is captured by audio input/capture device 104 and transmitted in real-time (or near real-time) to computing device 102. Alternatively, the acoustic input signal can comprise audio data that was captured by audio input/capture device 104 in the past and persisted to a non-volatile storage medium prior to being transmitted to computing device 102.

Computing device 102 can then process the acoustic input signal to detect, or spot, the utterance of a target word or phrase (referred to herein simply as a "target phrase") in the signal via a phrase spotter 106. Phrase spotter 106 can be any software and/or hardware based speech recognition system known in the art that is capable of performing this task. One example of such a system is described in commonly assigned U.S. Pat. No. 8,700,399, entitled "Systems and Methods for Hands-Free Voice Control and Search."

If phrase spotter 106 detects an utterance of the target phrase, phrase spotter 106 can cause computing device 102 to take an appropriate action. For instance, in scenarios where the target phrase is a "trigger" that indicates a user will immediately follow up the target phrase with one or more commands, phrase spotter 106 can cause computing device 102 to identify and process such commands. In these types of scenarios, phrase spotter 106 may run on a continuous basis (i.e., continuously monitor for an utterance of the target phrase in the environment of audio input/capture device 104). In this way, computing device 102 will always be listening and ready to accept the user's commands.

As noted in the Background section, one problem with performing phrase spotting on a continuous basis per the use case above is that phrase spotter 106 will likely generate a number of false accepts over time. This is because the recognition algorithm(s) used by phrase spotter 106 are not perfect, and the environment in which audio input/capture device 104 is located will likely have some level of background noise. Thus, given a long enough input signal (e.g., a continuous signal), phrase spotter 106 will eventually find an utterance of the target phrase in the signal that is not actually there.

To address this, computing device 102 can include a novel EPQ module 108. In various embodiments, EPQ module 108 can be implemented in software, hardware, or a combination thereof. As described in further detail below, EPQ module 108 can determine an estimate of the cumulative signal and noise energy for a target phrase utterance spotted by phrase spotter 106, as well as an estimate of the background noise energy in the acoustic input signal at the time of the spotted utterance. EPQ module 108 can then calculate an SNR for the spotted utterance based on these two estimates and compare the SNR to an SNR threshold. If the SNR is less than the SNR threshold, EPQ module 108 can reject the spotted utterance as being incorrect; otherwise, EPQ module 108 can accept the spotted utterance as being correct. Thus, EPQ module 108 can act as a "sanity check" that verifies the output of phrase spotter 106 (based on the relative energy levels of the spotted utterance and the surrounding background noise), thereby reducing the false accept rate of the system.

It should be appreciated that FIG. 1 is illustrative and not intended to limit embodiments of the present invention. For example, although phrase spotter 106 and EPQ module 108 are shown as separate components within computing device 102, in certain embodiments the functions of EPQ module 108 may be incorporated into phrase spotter 106.

Further, in embodiments where phrase spotter 106 and EPQ module 108 are implemented as separate components, phrase spotter 106 and EPQ module 108 may reside on or be executed by different devices/systems (rather than solely on/by computing device 102). For instance, in a particular embodiment, phrase spotter 106 may be executed by a server computing system and EPQ module 108 may be executed by an end-user computing system/device.

Yet further, the various components shown in FIG. 1 may include sub-components or perform functions that are not explicitly described. One of ordinary skill in the art will recognize many variations, modifications, and alternatives.

2. High-Level Flow

Figure 2:
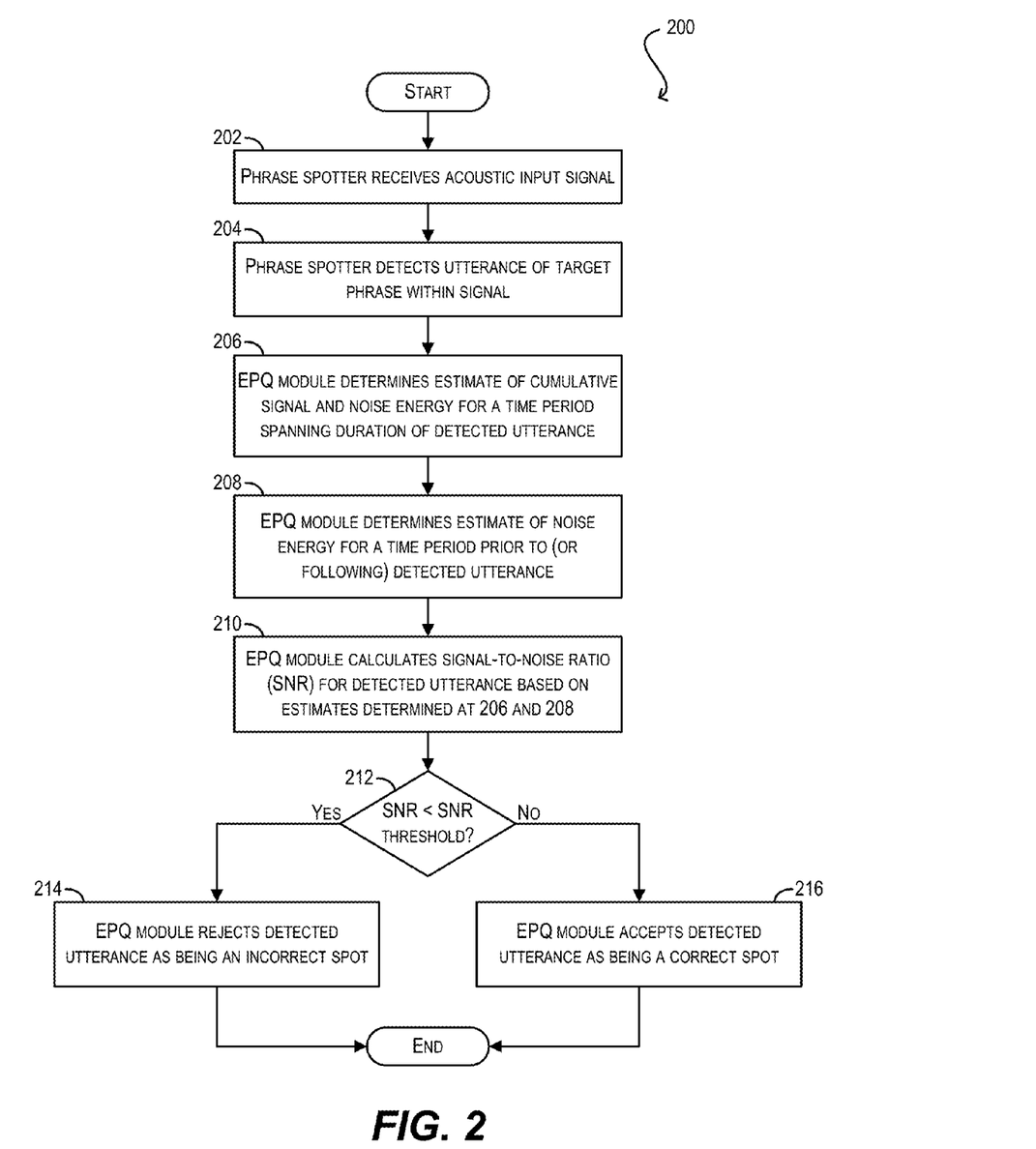
FIG. 2 depicts a flow diagram for applying energy post qualification to a phrase spotting task according to one embodiment.

FIG. 2 depicts a high-level flow 200 that can be performed by EPQ module 108 of FIG. 1 (in conjunction with phrase spotter 106) in order to reduce false accepts during phrase spotting according to an embodiment. At block 202, phrase spotter 106 can receive an acoustic input signal from, e.g., audio input/capture device 104. In one embodiment, the acoustic input signal can be a discrete (i.e., bounded) signal. In other embodiments, such as the "voice-based trigger" scenario mentioned previously, the acoustic input signal can be a continuous (i.e., unbounded) signal.

At block 204, phrase spotter 106 can process the acoustic input signal and detect, or spot, an utterance of a target phrase within the signal. Phrase spotter 106 can use any algorithm or combination of algorithms known in the art for this purpose, such as a Viterbi-based search algorithm.

Once an utterance of the target phrase has been detected by phrase spotter 106, EPQ module 108 can determine a first estimate of cumulative signal and noise energy within the signal (block 206). This first estimate can be determined with respect to a first time period spanning the duration of the detected utterance (i.e., the start time of the utterance to the end time of the utterance). Thus, the first estimate can reflect the total energy in the signal while the utterance was being made.

Further, at block 208, EPQ module 108 can determine a second estimate of noise energy within the signal. This second estimate can be determined with respect to a second time period that occurs immediately prior to, or following, the first time period. Thus, the second estimate can reflect a level of background noise in the signal at around the time of the detected utterance.

Upon determining the first and second estimates, EPQ module 108 can calculate an SNR for the detected utterance based on the determined estimates (block 210). For example, in one embodiment, this calculation can comprise subtracting the second estimate (i.e., noise energy estimate) from the first estimate (i.e., cumulative signal and noise energy estimate) to generate a signal energy estimate, and dividing the signal energy estimate by the second estimate to generate the SNR. In some embodiments, this SNR value can be converted to a logarithmic (e.g., decibel) scale.

Then, at block 212, EPQ module 108 can compare the calculated SNR to an SNR threshold. In one embodiment, the SNR threshold can be an SNR value that indicates approximately equal amounts of signal energy and noise energy (e.g., zero dB in scenarios where the decibel scale is used). If the SNR is less than the SNR threshold, EPQ module 108 can reject the detected utterance as being an incorrect spot (block 214). On the other hand, if the SNR is greater than or equal to the SNR threshold, EPQ module 108 can accept the detected utterance as being a correct spot (block 216).

Finally, after either block 214 or 216, flow 200 can end and computing device 102 can take an appropriate action based on whether the detected utterance was accepted or rejected.

With the approach shown in FIG. 2, the false accept rate of phrase spotter 106 can be significantly reduced when compared to implementations where phrase spotter 106 is used alone (i.e., without EPQ module 108). For instance, consider a situation where phrase spotter 106 incorrectly detects an utterance of the target phrase during continuous speech (where the detected utterance is at approximately the same energy level as the surrounding speech) or in "quiet" conditions (with uniformly low energy levels). In these cases, due to the way the SNR for the detected utterance is computed (i.e., based on energy estimates prior to/following and during the spotted phrase), the SNR will often be a negative value (in dB). Thus, EPQ module 108 can successfully reduce the false accept rate by simply filtering out those spots where the SNR is less than zero dB. In other scenarios/environments, the optimal SNR threshold may differ, but the general idea remains the same—i.e., EPQ module 108 can "sanity check" the spots made by phrase spotter 106 to ensure that there are reasonable in view of SNR-based heuristics, thereby reducing the number of false accepts.

It should be appreciated that flow 200 of FIG. 2 is illustrative and various modifications are possible. For example, although the determination of the first and second energy estimates (at blocks 206 and 208 respectively) are shown in flow 200 as occurring after the target phrase has been spotted/detected (at block 204), in some embodiments these estimates can be determined as part of the phrase spotting process. For instance, if phrase spotter 106 uses a Viterbi-based search algorithm, the algorithm itself can determine and save energy estimates during its search/alignment process, and can pass the energy estimates to EPQ module 108 if a spot is made.

In addition, it should be noted that flow 200 assumes that users will utter the target phrase in isolation, thereby allowing background noise energy to be estimated at block 208. This assumption can be enforced by, e.g., asking the users to pause either before or after uttering the target phrase (whichever is appropriate based on how the noise energy is determined). Generally speaking, they will be incentivized to do so because compliance will increase the accuracy, and thus usability, of the phrase spotting system.

3. Estimating SNR

As discussed above, EPQ module 108 calculates the SNR for a detected target phrase utterance using two energy estimates: a first estimate of cumulative signal and noise energy in the acoustic input signal during the utterance, and a second estimate of noise energy in the acoustic input signal either before, or after, the utterance. The following subsections describe various ways in which these two estimates can be determined.

3.1 Determining Energy Levels

As a first step in determining the first and second energy estimates, the energy level(s) at each time point (e.g., frame) in the relevant time period for the estimate should be determined (note that there may be multiple energy levels per time point, such as one per frequency range). In one embodiment, these energy levels can be determined directly from the energy of the waveform in the acoustic input signal. For instance, the energy levels for the first estimate can be determined from the energy of the waveform between the start time and end time of the detected utterance, and the energy levels for the second estimate can be determined from the energy of the waveform prior to, or following, the detected utterance.

In an alternative embodiment, the energy levels can be determined from feature vectors that are extracted from the acoustic input signal as part of the phrase spotting process. For example, if the feature vectors comprise the commonly-used Mel-Frequency Cepstral Coefficients (MFCC), the first coefficient will be correlated with the energy of the waveform. Thus, this first coefficient can be used for energy level determination. In some cases, a linear or nonlinear mapping may be implemented to convert the first coefficients to corresponding energy levels.

In yet another alternative embodiment, the energy levels can be determined from the average magnitude of the waveform amplitude, which is correlated with the energy of the waveform. In some cases, a linear or nonlinear mapping may be implemented to convert the average magnitude levels to the corresponding energy levels.

3.2 Combining Energy Levels

Once the energy levels across a given time period are determined (e.g., in the case of the first estimate, energy levels across the duration of the detected utterance), these energy levels should be combined using some measure of central tendency (e.g., mean, median, mode, etc.) to arrive at an energy estimate for the entire time period. In one embodiment, this can be achieved by calculating a simple average of all energy levels (i.e., each time point is given equal weighting). In other embodiments, the energy levels can be averaged using different weightings per time point. For example, in a particular embodiment, an exponentially-decaying moving average can be used, such that more weight is assigned to more recent time points in the time period.

As noted in section 3.1, in some cases multiple energy levels may be determined per time point (e.g., one energy level for a low frequency range, another energy level for a mid frequency range, and yet another energy level for a high frequency range). In these situations, the energy estimate can be computed over the entire frequency spectrum, or only over certain frequency ranges (e.g., those ranges that are deemed to be most important for speech perception).

Alternatively, the energy estimate can be computed using a weighed frequency scale, such that some frequencies are weighed more heavily (and thus contribute more to the computed energy) than other frequencies. Such a weighting can be implemented using, e.g., an A-weighting filter.

3.3 Determining Time Periods

The time periods for the first and second energy estimates can be determined in a number of different ways. For example, with respect to the first estimate, the time period spanning the duration of the detected utterance can be determined by the algorithm that phrase spotter 106 uses to perform the spot. For instance, if phrase spotter 106 uses a Viterbi-based search algorithm, the algorithm can return the start and end times for the detected phrase.

If the start time is unknown, it can be assumed to be the end time of the detected utterance, minus a fixed value such as an average duration for the target phrase.

With respect to the second estimate, the time period preceding (or following) the detected utterance can be determined based on the start or end times of the utterance respectively. For example, the start time for this time period may be defined as 200 milliseconds prior to the onset of the detected utterance, and the end time for this time period may be defined as the time at which the detected utterance begins. Other start and end times are also possible, and may vary depending on, e.g., the expected acoustic environment, computational considerations, and other criteria. For instance, if an exponentially decaying moving average is used to combine energy levels, the start time may be set to the beginning of the input acoustic signal.

It should be appreciated that the estimation methods described above are meant to be illustrative rather than exhaustive and are not intended to limit embodiments of the present invention. One of ordinary skill in the art will recognize many variations, modifications, and alternatives.

4. Setting the SNR Threshold

Since the SNR threshold ultimately controls which spots are accepted or rejected by EPQ module 108, setting/tuning this threshold is a key aspect of ensuring proper operation of module 108. The optimal value for the SNR threshold may be influenced by various factors, such as the content (e.g., phonemes) of the target phrase, the loudness of the background noise in the environment, the nature of that background noise, etc.

In certain embodiments, the SNR threshold can be a static value that is determined empirically for a given use case. In other embodiments, the SNR threshold can be adjusted dynamically on a per-spot basis. For instance, in a particular embodiment, EPQ module 108 can determine multiple estimates of noise energy, each corresponding to different time periods surrounding the detected utterance (e.g., a first time period 5 seconds before the detected utterance, a second time period immediately before the detected utterance, etc.). EPQ module 108 can then dynamically adjust the SNR threshold based on how the noise energy changes (in view of the multiple estimates) over time. For example, if the noise energy varies significantly over time, EPQ module 108 may use a more conservative (i.e., lower) value for the SNR threshold, such that fewer false accepts are rejected, but also few false rejects are generated. On the other hand, if the noise energy is relatively stationary, or non-varying, over time (such as "car" noise), EPQ module 108 may use a more aggressive (i.e., higher) value for the SNR threshold, such that more false accepts are rejected, but also a greater number of false rejects are generated.

5. Controlling the False Reject Rate

Regardless of how the SNR threshold is set, the operation of EPQ module 108 can only increase the false reject rate of phrase spotter 106, and can never decrease it (since EPQ module 108 only acts on identified spots). To offset this, in some embodiments phrase spotter 106 itself can be tuned to generate a lower than normal false reject rate when used in conjunction with EPQ module 108. For example, in one embodiment, phrase spotter 106 can be tuned such that it generates, on average, a false reject rate of X-Y, where X corresponds to its normal false reject rate (without EPQ) and Y corresponds to the increase in false reject rate attributed to EPQ. With this approach, the total false accept rate for the system can be reduced via EPQ, without increasing the false reject rate.

6. Further Extensions

There are a number of additional techniques that may further improve performance beyond the baseline EPQ technique described with respect to FIG. 2. Two of these techniques are shown in flow 300 of FIG. 3. Flow 300 is generally similar to flow 200 of FIG. 2. However, in flow 300, when EPQ module 108 calculates the first estimate of cumulative signal and noise energy, EPQ module 108 can compare the first estimate to a "speech" threshold (block 307). If the first estimate is below the speech threshold, EPQ module 108 can automatically reject the detected utterance, without performing any further SNR calculations. Otherwise, EPQ module 108 can continue on with its processing per flow 200. This technique will reject spots in situations where the spotted utterance is so quiet that it cannot be reliably detected, regardless of the SNR.

Figure 3:
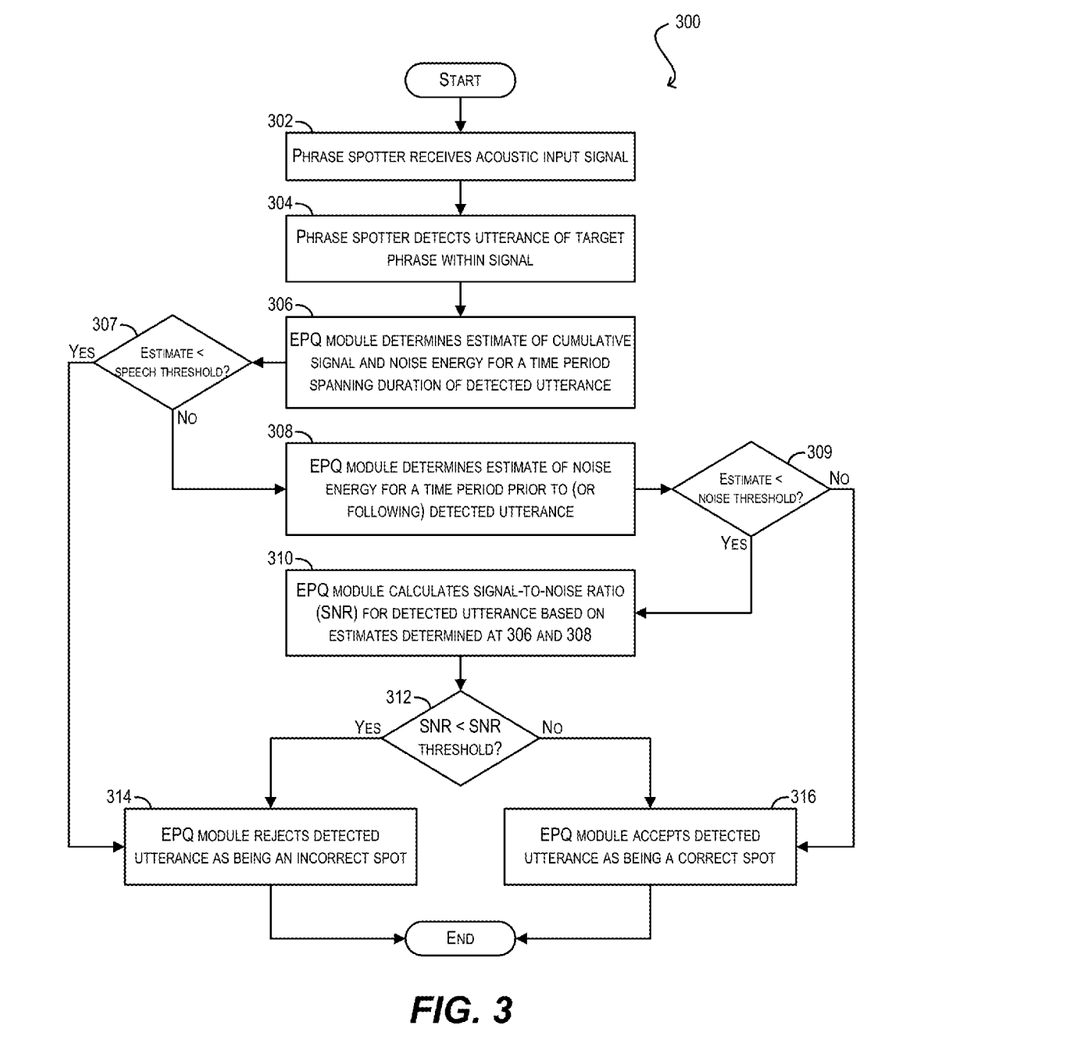
FIG. 3 depicts an alternative flow diagram for applying energy post qualification to a phrase spotting task according to one embodiment.

Further, when EPQ module 108 calculates the second estimate of noise energy, EPQ module 108 can compare the second estimate to a "noise" threshold (block 309). If the second estimate is above (or equal to) the noise threshold, EPQ module 108 can automatically accept the detected utterance, without performing any further SNR calculations. Otherwise, EPQ module 108 can continue on with its processing per flow 200. This technique will still accept spots where there is strong (perhaps transient) noise just before the spotted utterance, while preserving EPQ rejections for incorrectly spotted utterances in relatively quiet noise environments.

7. Exemplary Computing Device

Figure 4:
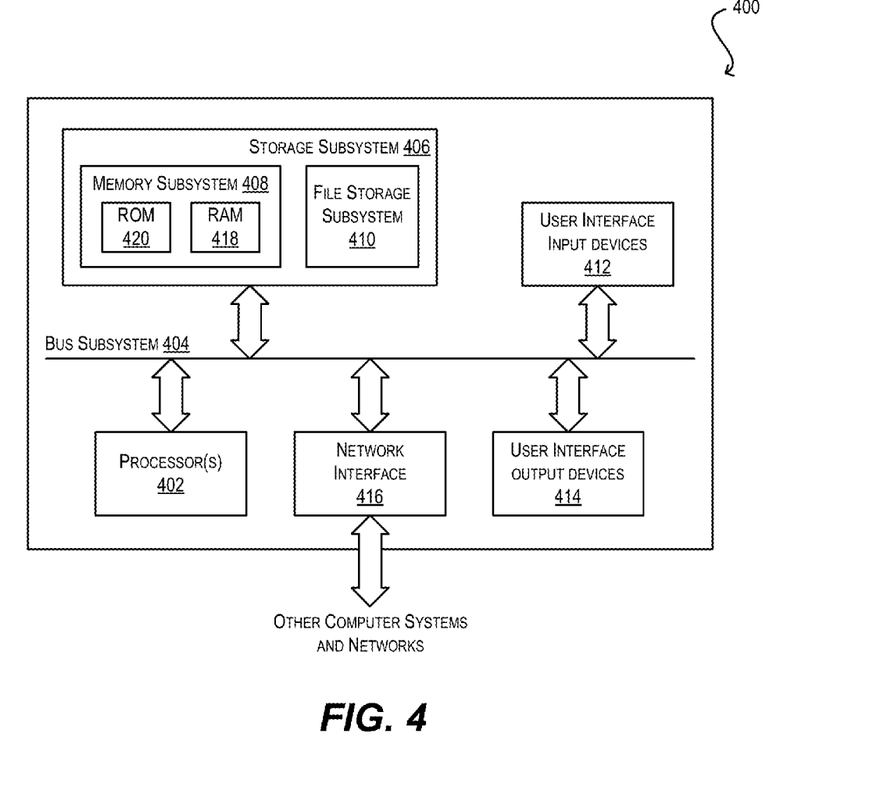
FIG. 4 depicts a block diagram of a computing device according to one embodiment.

FIG. 4 is a simplified block diagram of a computing device 400 according to an embodiment of the present invention. In one embodiment, computing device 400 can be used to implement computing device 102 of FIG. 1. As shown in FIG. 4, computing device 400 includes one or more processors 402 that communicate with a number of peripheral devices via a bus subsystem 404. These peripheral devices include a storage subsystem 406 (comprising a memory subsystem 408 and a file storage subsystem 410), user interface input devices 412, user interface output devices 414, and a network interface subsystem 416.

Bus subsystem 404 can provide a mechanism for letting the various components and subsystems of computing device 400 communicate with each other as intended. Although bus subsystem 404 is shown schematically as a single bus, alternative embodiments of the bus subsystem can utilize multiple busses.

Network interface subsystem 416 can serve as an interface for communicating data between computing device 400 and other computing devices or networks. Embodiments of network interface subsystem 416 can include, e.g., an Ethernet card, a Wi-Fi and/or cellular adapter, a modem (telephone, satellite, cable, ISDN, etc.), digital subscriber line (DSL) units, and/or the like.

User interface input devices 412 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computing device 400.

User interface output devices 414 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computing device 400.

Storage subsystem 406 includes a memory subsystem 408 and a file/disk storage subsystem 410. Subsystems 408 and 410 represent non-transitory computer-readable storage media that can store program code and/or data that provide the functionality of embodiments of the present invention.

Memory subsystem 408 includes a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 400 is illustrative and not intended to limit embodiments of the present invention. Many other configurations having more or fewer components than device 400 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   detecting, by a phrase spotter running on a computing device, an utterance of a target phrase within an acoustic input signal, the detecting comprising applying one or more phrase spotting algorithms to the acoustic input signal;
   determining, by the phrase spotter, a first estimate of cumulative signal and noise energy for the detected utterance in the acoustic input signal, the first estimate being determined with respect to a first time period spanning a start time and an end time of the detected utterance;
   determining, by the phrase spotter, a second estimate of noise energy in the acoustic input signal, the second estimate being determined with respect to a second time period that precedes or follows the first time period;
   calculating, by the phrase spotter, a signal-to-noise ratio (SNR) for the detected utterance based on the first estimate and the second estimate;
   if the SNR is below an SNR threshold, rejecting, by the phrase spotter, the detected utterance as being an incorrect spot of the target phrase; and
   if the SNR is not below the SNR threshold:
      accepting, by the phrase spotter, the detected utterance as being a correct spot of the target phrase; and
      causing the phrase spotter or another speech recognizer to identify and process a verbal command spoken after the detected utterance.

2. The method of claim 1 wherein the detecting is performed using a Viterbi-based search algorithm, and wherein start time and the end time of the detected utterance are determined by the algorithm.

3. The method of claim 1 wherein the start time of the detected utterance is estimated by subtracting a predetermined value from the end time of the detected utterance, the predetermined value corresponding to an average duration of the target phrase.

4. The method of claim 1 where the first estimate and the second estimate are determined based on waveform energy of the acoustic input signal.

5. The method of claim 1 wherein the first estimate and the second estimate are determined based on cepstral coefficients extracted from the acoustic input signal.

6. The method of claim 1 wherein the first estimate and the second estimate are determined based on an average magnitude of the acoustic input signal.

7. The method of claim 1 wherein the first estimate and the second estimate are determined over a full frequency range of the acoustic input signal.

8. The method of claim 1 wherein the first estimate and the second estimate are determined over certain frequency ranges of the acoustic input signal are that deemed important for speech perception.

9. The method of claim 1 wherein the first estimate and the second estimate are determined using a weighted frequency scale, such that certain frequency ranges are weighed more heavily than other frequency ranges.

10. The method of claim 1 wherein the acoustic input signal is divided into a plurality of frames, and wherein the first estimate and the second estimate are determined by averaging energy across frames in the first time period and the second time period respectively.

11. The method of claim 1 wherein the acoustic input signal is divided into a plurality of frames, and wherein the first estimate and the second estimate are determined by calculating a decaying moving average of energy across frames in the first time period and the second time period respectively.

12. The method of claim 1 wherein calculating the SNR for the spoken utterance comprises:
   subtracting the second estimate from the first estimate to calculate an estimate of signal energy, and
   dividing the estimate of signal energy by the second estimate to calculate the SNR.

13. The method of claim 12 wherein calculating the SNR for the spoken utterance further comprises:
   subsequently to the dividing, converting the SNR to a logarithmic scale.

14. The method of claim 1 wherein the SNR threshold is predetermined based on content of the target phrase or characteristics of the environment in which the detecting is performed.

15. The method of claim 1 wherein the detecting is performed using a phrase spotting algorithm that normally achieves a first false reject rate, and
   wherein the phrase spotting algorithm is tuned to achieve a second false reject rate that lower than the first false reject rate, such that a false reject rate achieved by using the phrase spotting algorithm in conjunction with the method of claim 1 is substantially similar to the first false reject rate.

16. The method of claim 1 further comprising, prior to calculating the SNR for the spoken utterance:
   comparing the first estimate to a speech threshold; and
   if the first estimate is below the speech threshold, rejecting the detected utterance without calculating the SNR.

17. The method of claim 1 further comprising, prior to calculating the SNR for the spoken utterance:
   comparing the second estimate to a noise threshold; and
   if the second estimate is greater or equal to the noise threshold, accepting the detected utterance without calculating the SNR.

18. The method of claim 1 wherein multiple estimates of noise energy in the acoustic input signal are determined, and wherein the SNR threshold is dynamically adjusted based on how the multiple estimates of noise energy change over time.

19. A non-transitory computer readable storage medium having stored thereon program code for executing a phrase spotter on a processor, the program code comprising:
   code that causes the processor to detect an utterance of a target phrase within an acoustic input signal, the detecting comprising applying one or more phrase spotting algorithms to the acoustic input signal;
   code that causes the processor to determine a first estimate of cumulative signal and noise energy for the detected utterance in the acoustic input signal, the first estimate being determined with respect to a first time period spanning a start time and an end time of the detected utterance;
   code that causes the processor to determine a second estimate of noise energy in the acoustic input signal, the second estimate being determined with respect to a second time period that precedes or follows the first time period;
   code that causes the processor to calculate a signal-to-noise ratio (SNR) for the detected utterance based on the first estimate and the second estimate;

if the SNR is below an SNR threshold, code that causes the processor to reject the detected utterance as being an incorrect spot of the target phrase; and if the SNR is not below the SNR threshold:

code that causes the processor to accept the detected utterance as being a correct spot of the target phrase; and     code that causes the processor to identify and process a verbal command spoken after the detected utterance.

20. A device comprising:

a processor; and a non-transitory computer readable medium having stored thereon instructions that, when executed by the processor, cause the processor to executing a phrase spotter by:

detecting an utterance of a target phrase within an acoustic input signal, the detecting comprising applying one or more phrase spotting algorithms to the acoustic input signal;

determining a first estimate of cumulative signal and noise energy for the detected utterance in the acoustic input signal, the first estimate being determined with respect to a first time period spanning a start time and an end time of the detected utterance;

determining a second estimate of noise energy in the acoustic input signal, the second estimate being determined with respect to a second time period that precedes or follows the first time period;

calculating a signal-to-noise ratio (SNR) for the detected utterance based on the first estimate and the second estimate;

if the SNR is below an SNR threshold, rejecting the detected utterance as being an incorrect spot of the target phrase; and     if the SNR is not below the SNR threshold:

accepting the detected utterance as being a correct spot of the target phrase; and         identifying and processing a verbal command spoken after the detected utterance.

\* \* \* \* \*